March 5, 1935.   F. C. BLANCHARD   1,993,588
LUBRICATING SYSTEM
Filed June 21, 1934   2 Sheets-Sheet 1
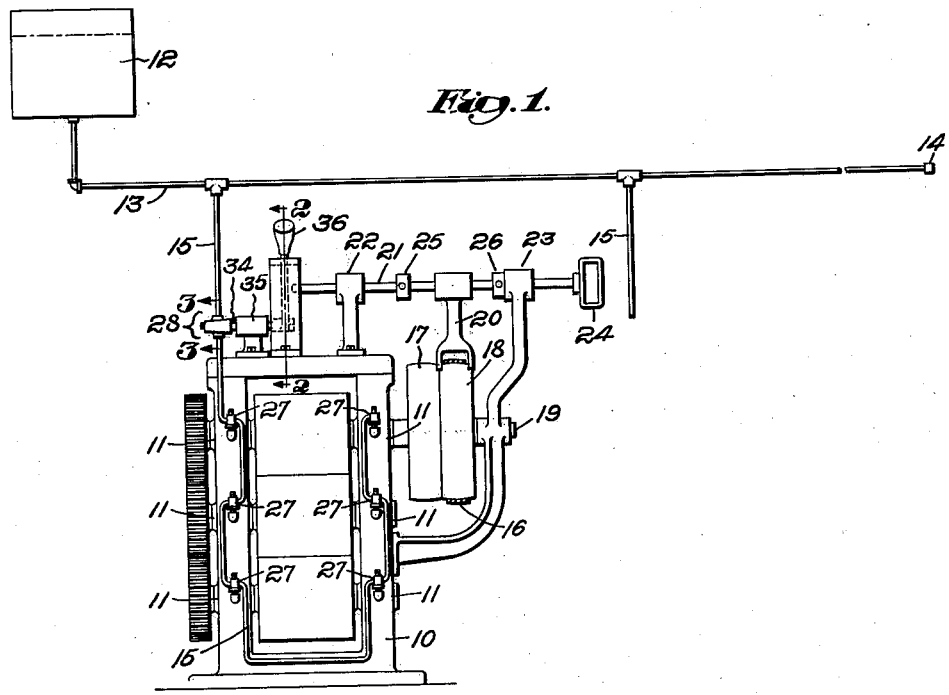
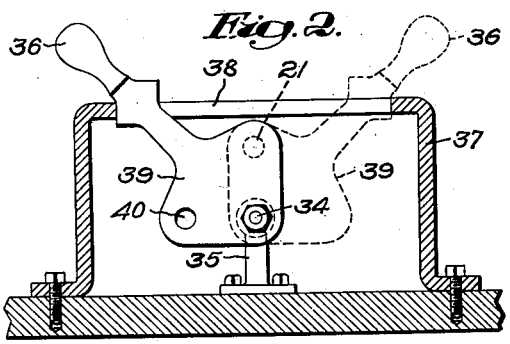
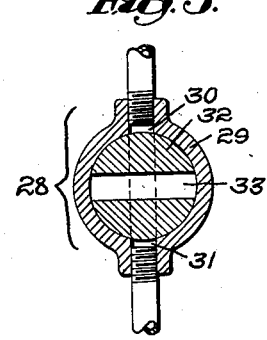
Inventor:
Frederick C. Blanchard,
by Emery, Booth, Varney & Townsend
Attys March 5, 1935.  F. C. BLANCHARD  1,993,588
LUBRICATING SYSTEM
Filed June 21, 1934  2 Sheets-Sheet 2
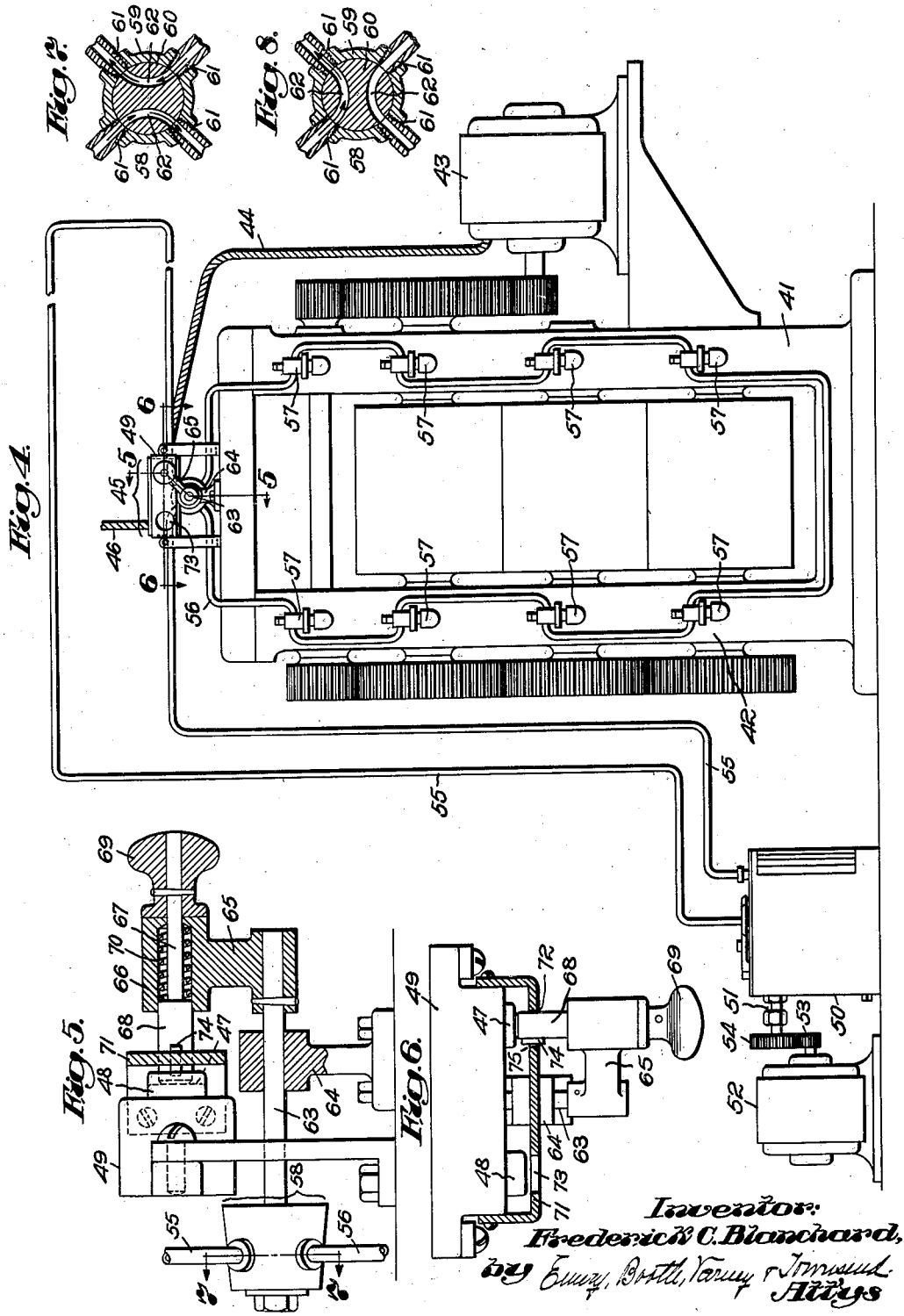

Patented Mar. 5, 1935

1,993,588

UNITED STATES PATENT OFFICE 1,993,588

LUBRICATING SYSTEM

Frederick C. Blanchard, Brookline, Mass.

Application June 21, 1934, Serial No. 731,667

23 Claims. (Cl. 184—6)

This invention relates to automatic lubricating systems for application to industrial and other machinery of various kinds such as machine tools, woodworking machinery, paper machinery, printing presses, rubber mills, sugar mills and crushing and pulverizing mills. The invention is concerned with an interlocking control of the application of power to a machine and the supply of lubricant thereto, the arrangement being such that the oil supply to the machine must be established before the machine can be started, and the machine must be stopped before the oil supply can be cut off. Thus injury to the machine bearings by lack of oil is prevented.

The invention may be applied to one machine or to a group of machines supplied by a common conduit. It may be applied to a machine having an individual motor drive or to a machine driven by a belt where the application of power is controlled by a belt shifter. Examples of electrical and mechanical controls are disclosed herein. There are many ways of accomplishing the interlock on both electrical and mechanical controls, but one of each will serve as a sufficient example.

So far as the lubricating system is concerned, the invention is not limited to any particular type of system. In one form herein shown by way of example, there is an elevated reservoir which supplies oil to a dead-end conduit which may have one or more branches serving as many machines with a control valve associated with each, while in the other example there is a reservoir and an associated pump which circulates oil through a main loop line extending from the pump past the machine or machines to be lubricated and back to the reservoir, and an auxiliary loop line associated with the machine and cut into and out of the main line by a valve associated with the machine. These examples, however, are merely typical.

The invention will best be understood by reference to the following description when taken in connection with the accompanying drawings of two specific embodiments thereof, while its scope will be pointed out more particularly in the appended claims.

In the drawings:

Fig. 1 is an elevation of a lubricating system exemplifying the invention as applied to a machine;

Fig. 2 is a sectional view on an enlarged scale on line 2—2 of Fig. 1;

Fig. 3 is a sectional view on an enlarged scale on line 3—3 of Fig. 1;

Fig. 4 is an elevation of another lubricating system exemplifying the invention as applied to a machine;

Fig. 5 is a sectional view on an enlarged scale on line 5—5 of Fig. 4;

Fig. 6 is a sectional view on an enlarged scale on line 6—6 of Fig. 4; and

Figs. 7 and 8 are sectional views on line 7—7 of Fig. 5 showing the valve in two positions.

Referring to Figs. 1, 2 and 3 of the drawings and to the embodiment of the invention illustrated therein by way of example, there is shown a machine 10 having one or more, herein a plurality, of bearings 11 to be lubricated. The lubricating system shown comprises an elevated reservoir 12 to contain a supply of lubricating oil and to furnish oil under pressure to a main conduit 13 to supply oil to the bearing or bearings of one or more machines to be lubricated. In the present example the conduit 13 has an outlying dead-end 14, and there are branches 15, one for each of the machines to be lubricated, though it is deemed unnecessary to show more than one machine and its associated controls.

Power may be applied to the machine by an appropriate driving element, herein a belt 16, engageable with tight and loose pulleys 17 and 18 on a driving shaft 19. The application of power to the machine is controlled by power control means, herein a belt shifter, comprising a fork 20 which straddles the belt. When the belt is engaged with the tight pulley the machine is driven, and when the belt is engaged with the loose pulley, the machine is stopped. The fork is actuated by an actuator comprising a sliding rod 21 to which it is secured, said rod being mounted in guides 22 and 23, and being provided with a handle 24 by means of which it may be moved lengthwise to accomplish the shifting of the belt. Lengthwise movement of the rod in opposite directions is predetermined as by collars 25 and 26 secured to the rod and adapted to engage the guides 22 and 23 respectively.

Each of the bearings 11 is equipped with an appropriate feeder 27 which, as shown, are connected together in series in the branch line 15. The flow of lubricant from the conduit 13 to the machine bearings is controlled by lubricant control means, herein a valve 28, of appropriate construction, the one herein shown comprising a stator 29 provided with inlet and outlet passages 30 and 31 and a rotor 32 provided with a passage 33 which, when brought into registration with the passages 30 and 31 (as shown in dotted lines in Fig. 3) by rotation of the rotor, establishes communication between the main conduit 13 and that part of the branch conduit 15 which lies outwardly beyond the valve 28, thus to supply oil to the feeders 27. When the rotor is turned so that its passage is in the position shown in full lines in Fig. 3, the flow of lubricant from the conduit 13 to the bearings is prevented.

The valve is actuated by an actuator herein comprising a rockshaft 34 mounted in a bearing 35 and provided with a handle 36 fixed thereto. Swinging motion of the handle, consequently turning movement of the valve, is conveniently limited by a bracket 37 provided with a slot 38 in which the handle plays to and fro. Of course, the limitation of the angular movement of the handle should agree with the desired angular movement of the valve rotor, which, in this case, is 90 degrees. In Fig. 2 the handle is shown in full lines in the position which it occupies when the valve is closed, and it is shown in dotted lines in the position which it occupies when the valve is open.

As already stated in a general way, the invention comprises an interlock which prevents power from being applied to the machine until the supply of oil to the bearings has been established, and which makes it impossible to discontinue the supply of oil until the machine has been stopped. This interlock includes what may be termed an inhibitor which is constructed and arranged to inhibit power applying movement of the power control means when the lubricant control means is in position to prevent the flow of lubricant from the main conduit to the bearing or bearings, and to permit power applying movement of the power control means when the lubricant control means is in a position to permit the flow of lubricant from the main conduit to the bearing or bearings.

In this example the inhibitor is simply a stop 39 conveniently formed as a part of the handle 36, said stop, when in the closed position of the valve (corresponding to the position of the handle shown in Fig. 2), being in the path of the power control element, i. e., the rod 21, and thus preventing power applying movement of the power control element. This will be clearly apparent from a comparison of Figs. 1 and 2. When, however, the lubricant controller, i. e., the handle 36, is moved from the position shown in full lines in Fig. 2 to the position shown in dotted lines therein, that is, to the position wherein the valve permits the flow of lubricant to the bearings, the inhibitor, i. e., the stop 39, presents no obstacle to power applying movement of the power control element 21. This is conveniently possible in the present example by providing the stop 39 with an aperture 40 which, in the dotted line position of the handle shown in Fig. 2, is in registration with the end of the rod 21, and therefore the power controller, i. e., the belt shifter 20, may be moved toward the left as viewed in Fig. 1 to shift the belt 16 from the loose pulley 18 to the tight pulley 17, thereby to start the machine.

Conversely, when the machine is running, the end of the rod 21 is in the aperture 40, and therefore it is impossible to shut off the oil because the power control means and the lubricant control means are now interlocked and they will remain interlocked until the machine is stopped by moving the power controller to shift the belt from the tight pulley to the loose pulley.

In other words, as a consequence of movement of the valve actuator into a position in which the valve is open, the power control element is rendered available to apply power from the driving element to the machine, and, conversely, upon movement of the valve actuator into a position in which the valve is closed, the power control element is rendered unavailable to apply power from the driving element to the machine. Thus it is evident that there is no danger of injury to the bearings of the machine because operation of the latter without lubrication of its bearings is impossible.

The form employing an individual motor drive and an electrical interlocking control will now be described, reference being had to Figs. 4 to 8 inclusive. In this form a machine 41 having one or more, herein a plurality, of bearings 42 to be lubricated, is driven by an electric motor 43 which is conveniently controlled by what is commonly called a push button station, which is nothing more or less than a switch somewhat similar to a common wall switch and having two push buttons, one called a starting button and usually marked "Start", and a stopping button, usually marked "Stop". The one employed in the present example is a type which is known as "maintaining-contact", and when the push button marked "Start" is pushed, current to the motor is maintained until the button marked "Stop" is pressed, whereupon current to the motor is cut off. These two buttons are mechanically interconnected, so that when one button is pushed in the other one comes out. Inasmuch as these push button stations are well known and commercially available, it is deemed unnecessary to illustrate or to describe one in detail.

As shown, the motor 43 is connected by a two-wire cable 44 to a push button station 45 to which there is also connected a cable 46 containing two power mains for supplying current under the control of a "start" button 47 and a "stop" button 48 mounted in a housing 49. When the "start" button 47 is pushed inwardly current is supplied to the motor 43 and the machine is started. When the "stop" button 48 is pushed inwardly the "start" button 47 comes out and the current is cut off from the motor.

In this form of the invention the lubricating system shown by way of example is similar to that which is disclosed in United States Letters Patent No. 1,953,824 issued to me April 3, 1934, and comprises a tank 50 presenting a reservoir for oil. As described in said patent, this tank contains a pumping unit driven by a shaft 51 to which power is applied by an electric motor 52 through gears 53 and 54. Leading from and back to the reservoir is a conduit system comprising a pipe 55 which may be called the main loop, and associated with the machine is a pipe 56 which may be termed an auxiliary loop, and which connects in series a plurality of appropriate feeders 57, one for each bearing, and whose construction is or may be like those which are shown and described in said patent.

Diversion of oil from the main loop line into and through the auxiliary loop line and its feeders and return of unused oil back to the main loop line is conveniently accomplished in the present example by a lubricant control valve 58 (see Figs. 7 and 8) comprising a stator 59 and a rotor 60. The stator is provided with four ports 61 and the rotor is provided with two passages 62. As shown in Fig. 7, the stator is in the position in which the local auxiliary loop is in communication with, and for the time being virtually a part of, the main loop, in the sense that the entire column of oil flowing through the main loop flows through the local auxiliary loop line. When the rotor is in the position shown in Fig. 8, the local auxiliary loop is disconnected from the main line and the column of oil in the main line loop flows past the local auxiliary loop without entering it. To turn the rotor, the latter is secured to a valve actuator such as a rockshaft 63 (see Fig. 5) which is mounted in a bearing 64 and has secured to it an arm 65 which, when swung to and fro through the proper angular distance, turns the rotor through the required angular distance to shift the rotor from the position represented in Fig. 7 to the position shown in Fig. 8, and vice versa.

There is provided between the lubricant control element and the power control element an interlock which will now be described, reference being had to Figs. 5 and 6. The arm 65 is provided with a chamber 66 parallel to the rockshaft 63 and furnishing guidance for a plunger 67 provided at one end with a head 68 and at its other end with a handle or knob 69, while a helically coiled spring 70 about the shank of the plunger and bearing against the head 68 constantly tends to urge the latter toward the push button station 45. The strength of the spring 70 is sufficient so that when the plunger is in registration with either of the push buttons 47, 48 the spring will cause the plunger to push the button inwardly and operate the switch. In Figs. 4, 5 and 6 the plunger is against the "start" button, and this is the position in which the current is supplied to the motor to drive the machine. In this position also the rotor of the valve is in the position shown in Fig. 7 to supply oil to the machine bearings.

The on and off positions of the interlock arm 65 are conveniently predetermined by a masking plate 71 secured to the housing 49 and provided with apertures 72 and 73 registering with the push buttons 47 and 48 respectively, there being sufficient clearance between the plate and the push buttons (see Fig. 6) to permit the proper outward movement of each button when the other button is pushed inwardly. When the machine is to be stopped the operator grasps the knob 69 and by exerting an outward pull on the plunger 67 withdraws the head 68 and the plunger from its engagement with the button 47 until the inner end of the plunger head clears the front face of the masking plate 71, whereupon the arm 65 may be swung from the position shown in Figs. 4 and 6 toward the left until the plunger head registers with the aperture 73, whereupon the spring 70 asserts itself to push the plunger inwardly against the "stop" button 48, thereby cutting off current from the motor and stopping the machine. As the arm 65 is being swung from the running position to the stop position, the valve rotor by reason of its connection with the arm is turned from the position shown in Fig. 7 to the position shown in Fig. 8, whereupon the oil is no longer diverted from the main loop into the auxiliary loop, but passes by and continues on and back to the reservoir.

Thus it will be seen that in this case the masking plate 71 is an inhibitor which, in cooperation with the plunger, inhibits power applying movement of the power control means when the lubricant control means is in position to prevent the flow of lubricant from the main conduit to the machine bearings and to permit power applying movement of the power control means when the lubricant control means is in position to permit the flow of lubricant from the main conduit to the machine bearings. In other words, there is an interlock between the lubricant controller and the power controller, so that power applying movement of the power controller is impossible when the lubricant controller is in position to prevent the flow of lubricant from the main conduit to the machine bearings. When the valve is in a position to permit the flow of lubricant to the machine bearings, the power control element is free to apply power from the driving element to the machine. Otherwise expressed, there is means consequent upon movement of the valve actuator into a position in which the valve is in its "on" position to render the power control element available to apply power from the driving element to the machine, and on the other hand, upon movement of the valve actuator to a position in which the valve is "off", to render the power control element unavailable to apply power from the driving element to the machine. Thus it is impossible for the machine bearings to be injured by operation of the machine without the application of lubricant to its bearings.

In both forms of the invention, the starting of the machine may be delayed as long as desired to permit the application of sufficient lubricant to the machine before power is applied to the latter, and this is a distinct advantage, because after the machine has been out of service for some time, particularly when the oil is cold, it may be desirable to apply oil to the machine for a substantial period of time before the machine is started. In the interim the oil may be subjected to heat if desired.

In the form shown in Figs. 4 to 8 inclusive, the application of oil to the machine may be continued for the desired length of time before current is applied to start the motor by the operator simply retaining his grasp on the knob 69 after the plunger head 68 is in registration with the "start" button 47, and thus holding the spring 70 in restraint. However, as shown, the plunger is provided with a key 74, and the masking plate 71 is provided with a keyway 75 to receive the key when the latter is in registration with the keyway, the length of the key, however, being such that, when the plunger head 68 is in the aperture 72, and when the plunger rotates about its own axis to bring the key out of registration with the keyway, the inner end of the key engages the front face of the masking plate and prevents the spring 70 from pushing the plunger against the "start" button 47.

Under these circumstances, the operator can leave the machine for any desired length of time, during which the oil will continue to flow, after which he may return to the machine and turn the plunger 67 to bring the key 74 into registration with the keyway 75, whereupon, as the operator releases his grasp on the knob 69, the spring 70 will assert itself to cause the plunger to thrust the "start" button inwardly, thereby to start the motor. The diameter of the aperture 73, however, is great enough to accommodate the key 74 in any position of the latter about the axis of the plunger 67, so that the plunger, when released, will cause the stoppage of the motor immediately upon the return of the arm 65 to its initial position in which the valve 58 stops the flow of oil to the machine.

Having thus described two embodiments of the invention, but without limiting myself thereto, what I claim and desire by Letters Patent to secure is:

1. The combination of a machine having one or more bearings to be lubricated, a lubricating system comprising a conduit to supply lubricant to said bearing or bearings, a driving element from which power may be applied to said machine, lubricant control means for controlling the flow of lubricant from said conduit to said bearing or bearings, power control means for controlling the application of power from said driving element to said machine, an actuator for said lubricant control means, an actuator for said power control means, and an inhibitor constructed and arranged to inhibit power-applying movement of said power control means when said lubricant control means is in position to prevent the flow of lubricant from said conduit to said bearing or bearings, and to permit power-applying movement of said power control means when said lubricant control means is in position to permit the flow of lubricant from said conduit to said bearing or bearings.

2. The combination of a machine having one or more bearings to be lubricated, a lubricating system comprising a conduit to supply lubricant to said bearing or bearings, a driving element from which power may be applied to said machine, a lubricant controller for controlling the flow of lubricant from said conduit to said bearing or bearings, a power controller for controlling the application of power from said driving element to said machine, and means providing an interlock between said controllers so that power-applying movement of said power controller is impossible when said lubricant controller is in position to prevent flow of lubricant from said conduit to said machine.

3. The combination of a machine having one or more bearings to be lubricated, a lubricating system comprising a conduit to supply lubricant to said bearing or bearings, a driving element from which power may be applied to said machine, a lubricant control valve for controlling the flow of lubricant from said conduit to said bearing or bearings, a power control element for controlling the application of power from said driving element to said machine, and a valve actuator for actuating said valve, said valve actuator having one position in which said valve cuts off the supply of lubricant to said bearing or bearings and in which said power control element is prevented from applying power from said driving element to said machine, and another position in which said valve permits the supply of lubricant to said bearing or bearings and in which said power control element is free to apply power from said driving element to said machine.

4. The combination of a machine having one or more bearings to be lubricated, a lubricating system comprising a conduit to supply lubricant to said bearing or bearings, a driving element from which power may be applied to said machine, a lubricant control valve for controlling the flow of lubricant from said conduit to said bearing or bearings, a power control element for controlling the application of power from said driving element to said machine, a valve actuator for actuating said valve, and means consequent upon movement of said valve actuator into a position in which said valve cuts off the supply of lubricant to said bearing or bearings to render said power control element available to apply power from said driving element to said machine and, upon movement of said valve actuator into a position in which said valve permits the supply of lubricant to said bearing or bearings, to render said power control element unavailable to apply power from said driving element to said machine.

5. The combination of a machine having one or more bearings to be lubricated, a lubricating system comprising a conduit to supply lubricant to said bearing or bearings, a driving element from which power may be applied to said machine, a lubricant control valve for controlling the flow of lubricant from said conduit to said bearing or bearings, a power control element for controlling the application of power from said driving element to said machine, a valve actuator for actuating said valve, and a stop which, in the closed position of said valve, is in the path of said power control element and prevents power-applying movement of said power control element, and which, in the open position of said valve, presents no obstacle to power-applying movement of said power control element.

6. The combination of a machine having one or more bearings to be lubricated, a lubricating system to supply lubricant to said bearing or bearings, a driving element from which power may be applied to drive said machine, lubricant control means for controlling the flow of lubricant from said system to said bearing or bearings, and power control means for controlling the application of power from said driving element to said machine, said lubricant control means and said power control means comprising relatively movable interlocking parts which, in one relative position, cooperate to inhibit power-applying movement of said power control means while permitting lubricant-applying movement of said lubricant control means, and which, in another relative position, inhibit lubricant-discontinuing movement of said lubricant control means while permitting power-discontinuing movement of said power control means.

7. The combination of a machine having one or more bearings to be lubricated, a lubricating system to supply lubricant to said bearing or bearings, a driving element from which power may be applied to drive said machine, lubricant control means for controlling the flow of lubricant from said system to said bearing or bearings, and power control means for controlling the application of power from said driving element to said machine, said lubricant control means and said power control means comprising relatively movable interlocking parts which, in one relative position, cooperate to inhibit power-applying movement of said power control means while permitting lubricant-applying movement of said lubricant control means, and which, in another relative position, inhibit lubricant-discontinuing movement of said lubricant control means while permitting power-discontinuing movement of said power control means, one of said parts being mounted to move toward and from the other, and the other being mounted to move into and out of the path of the first.

8. The combination of a machine having one or more bearings to be lubricated, a lubricating system to supply lubricant to said bearing or bearings, a driving element from which power may be applied to drive said machine, lubricant control means for controlling the flow of lubricant from said system to said bearing or bearings, and power control means for controlling the application of power from said driving element to said machine, said lubricant control means and said power control means comprising relatively movable interlocking parts which, in one relative position, cooperate to inhibit power-applying movement of said power control means while permitting lubricant-applying movement of said lubricant control means, and which, in another relative position, inhibit lubricant-discontinuing movement of said lubricant control means while permitting power-discontinuing movement of said power control means, one of said parts being mounted for sliding movement toward and from the other, and the other being mounted for rocking movement into and out of the path of the first.

9. The combination of a machine having one or more bearings to be lubricated, a lubricating system to supply lubricant to said bearing or bearings, a driving element from which power may be applied to drive said machine, lubricant control means for controlling the flow of lubricant from said system to said bearing or bearings, and power control means for controlling the application of power from said driving element to said machine, said lubricant control means and said power control means comprising relatively movable interlocking parts which, in one relative position, cooperate to inhibit power-applying movement of said power control means while permitting lubricant-applying movement of said lubricant control means, and which, in another relative position inhibit lubricant-discontinuing movement of said lubricant control means while permitting power-discontinuing movement of said power control means, one of said parts being mounted for sliding movement toward and from the other, and the other being mounted for rocking movement into and out of the path of the first, and being provided with an opening which, in one position, receives the first and is thereby locked against rocking movement.

10. The combination of a machine having one or more bearings to be lubricated, a lubricating system to supply lubricant to said bearing or bearings, a driving element from which power may be applied to drive said machine, a rocking control valve for controlling the flow of lubricant to said bearing or bearings, a sliding power control element for controlling the application of power from said driving element to said machine, and a rocking valve actuator for rocking said valve, said valve actuator having means which, in one position prevents power-applying movement of said power control element, and which, in another position, permits power-applying movement of said power control element and is itself prevented from moving said valve when said power control element is in its power-applying position.

11. The combination of a machine having one or more bearings to be lubricated, a lubricating system to supply lubricant to said bearing or bearings, a driving element from which power may be applied to drive said machine, a rocking control valve for controlling the flow of lubricant to said bearing or bearings, a sliding power control element for controlling the application of power from said driving element to said machine, and a rocking valve actuator for rocking said valve, said valve actuator having means which, in one position, prevents power-applying movement of said power control element, and is provided with an opening, which, in another position of said means, permits power-applying movement of said power control element, and in the power-application position of said power control element is itself locked by the latter against valve-operating movement.

12. The combination of a machine having one or more bearings to be lubricated, a lubricating system to supply lubricant to said bearing or bearings, an electric motor from which power may be applied to drive said machine, a lubricant controller for controlling the flow of lubricant from said system to said bearing or bearings, a power controller for controlling the application of current to said motor, and means providing an interlock between said controllers so that current-applying movement of said power controller is impossible when said lubricant controller is in position to prevent flow of lubricant from said system to said machine.

13. The combination of a machine having one or more bearings to be lubricated, a lubricating system to supply lubricant to said bearing or bearings, an electric motor from which power may be applied to drive said machine, a lubricant controller for controlling the flow of lubricant from said system to said bearing or bearings, a power controller for controlling the application of current to said motor, and means providing an interlock between said controllers so that current-applying movement of said power controller is impossible when said lubricant controller is in position to prevent flow of lubricant from said system to said machine, a part of said means being carried by said lubricant controller.

14. The combination of a machine having one or more bearings to be lubricated, a lubricating system to supply lubricant to said bearing or bearings, an electric motor from which power may be applied to drive said machine, a lubricant controller for controlling the flow of lubricant from said system to said bearing or bearings, a power controller for controlling the application of current to said motor, and means providing an interlock between said controllers so that current-applying movement of said power controller is impossible when said lubricant controller is in position to prevent flow of lubricant from said system to said machine, said lubricant controller including an actuator, and said power controller including an actuator, said power controller actuator being carried by said lubricant controller actuator.

15. The combination of a machine having one or more bearings to be lubricated, a lubricating system to supply lubricant to said bearing or bearings, an electric motor from which power may be applied to drive said machine, a lubricant controller for controlling the flow of lubricant from said system to said bearing or bearings, a power controller for controlling the application of current to said motor, and means providing an interlock between said controllers so that current-applying movement of said power controller is impossible when said lubricant controller is in position to prevent flow of lubricant from said system to said machine, said lubricant controller including an actuator, and said power controller including a spring-pressed actuator whose spring pressure controls the application and discontinuance of current to and from said motor, said power controller actuator being carried by said lubricant controller actuator.

16. The combination of a machine having one or more bearings to be lubricated, a lubricating system to supply lubricant to said bearing or bearings, an electric motor from which power may be applied to drive said machine, a valve for controlling the flow of lubricant from said system to said bearing or bearings, a switch for controlling the application of current to said motor, a valve actuator for actuating said valve, and a switch actuator for actuating said switch, said switch actuator being carried by said valve actuator.

17. The combination of a machine having one or more bearings to be lubricated, a lubricating system to supply lubricant to said bearing or bearings, an electric motor from which power may be applied to drive said machine, a valve for controlling the flow of lubricant from said system to said bearing or bearings, a switch for controlling the application of current to said motor, a valve actuator for actuating said valve, a switch actuator for actuating said switch, said switch actuator being carried by said valve actuator, said switch actuator including a spring to cause current application and current discontinuance by said switch, and an inhibitor which resists switch operating movement of said spring except when said valve actuator is in either of two positions, one in which said valve admits lubricant from said lubricating system to said bearing or bearings, and the other in which said valve discontinues the supply of lubricant from said lubricating system to said bearing or bearings.

18. The combination of a machine having one or more bearings to be lubricated, a lubricating system to supply lubricant to said bearing or bearings, an electric motor from which power may be applied to drive said machine, a valve for controlling the flow of lubricant from said system to said bearing or bearings, a switch for controlling the application of current to said motor, said switch including start and stop buttons, a valve actuator for actuating said valve, a switch actuator for actuating said switch, said switch actuator being carried by said valve actuator, said switch actuator including a button operating plunger, and a spring to cause said plunger to push said buttons, and a masking plate which resists button operating movement of said plunger except when said valve is in either of two positions, one in which said valve admits lubricant from said system to said bearing or bearings, and the other in which said valve discontinues the supply of lubricant from said system to said bearing or bearings.

19. In a lubricating system for the bearing or bearings of a machine, the combination of power control means for controlling the application of power to the machine, lubricant control means for controlling the application of lubricant to the machine, and master control means for controlling said power control means and said lubricant control means, said master control means including interlocking elements inhibiting the application of power by said power control means until after said lubricant control means has operated to cause the application of lubricant to the machine.

20. In a lubricating system for the bearing or bearings of a machine, the combination of power control means for controlling the application of power to the machine, lubricant control means for controlling the application of lubricant to the machine, and master control means for controlling said power control means and said lubricant control means, said master control means including interlocking elements inhibiting the application of power by said power control means until after said lubricant control means has operated to cause the application of lubricant to the machine, and causing the discontinuance of the application of lubricant to the machine contemporaneously with the discontinuance of the application of power to the machine.

21. The combination of a machine having one or more bearings to be lubricated, a lubricating system to supply lubricant to said bearing or bearings, an electric motor from which power may be applied to drive said machine, a valve for controlling the flow of lubricant from said system to said bearing or bearings, a switch for controlling the application of current to said motor, said switch including start and stop buttons, a valve actuator for actuating said valve, a switch actuator for actuating said switch, said switch actuator being carried by said valve actuator, said switch actuator including a button operating plunger, and a spring to cause said plunger to push said buttons, a masking plate which resists button operating movement of said plunger except when said valve is in either of two positions, one in which said valve admits lubricant from said system to said bearing or bearings, and the other in which said valve discontinues the supply of lubricant from said system to said bearing or bearings, and a projection carried by said plunger and arranged to cooperate with said masking plate to prevent button operating movement of said plunger in said position in which said valve admits lubricant from said system to said bearing or bearings.

22. In a lubricating system for the bearing or bearings of a machine, the combination of power control means for controlling the application of power to the machine, lubricant control means for controlling the application of lubricant to the machine, and master control means for controlling said power control means and said lubricant control means, said master control means including interlocking elements inhibiting the application of power by said power control means until after said lubricant control means has operated to cause the application of lubricant to the machine, said master control means including also a spring to cause said power control means to apply power to the machine, and means at will to restrain said spring and to prevent the application of power under the influence of said spring until the restraint on said spring has been removed.

23. In a lubricating system for the bearing or bearings of a machine, the combination of power control means for controlling the application of power to the machine, lubricant control means for controlling the application of lubricant to the machine, and master control means for controlling said power control means and said lubricant control means, said master control means including interlocking elements inhibiting the application of power by said power control means until after said lubricant control means has operated to cause the application of lubricant to the machine, said master control means including also a spring to cause said power control means to apply power to the machine, and cooperating spring restraining elements having a relative position in which they restrain said spring and prevent the application of power under the influence of said spring, and having another relative position in which they do not restrain said spring.

FREDERICK C. BLANCHARD.